United States Patent

Nakano et al.

[11] Patent Number: 5,479,504
[45] Date of Patent: Dec. 26, 1995

[54] LOW VOLTAGE BALANCED HYBRID CIRCUIT WITH OPERATIONAL AMPLIFIERS

[75] Inventors: Takahiko Nakano, Ikoma; Shinji Hattori, Higashiosaka, both of Japan

[73] Assignee: Sharp Kabushiki Kaisha, Osaka, Japan

[21] Appl. No.: 207,711

[22] Filed: Mar. 9, 1994

[30] Foreign Application Priority Data

Apr. 16, 1993 [JP] Japan ................................ 5-090280

[51] Int. Cl.$^6$ ........................................ H04M 9/00
[52] U.S. Cl. .................... 379/402; 379/405; 379/399; 379/345
[58] Field of Search ........................... 379/405, 402, 379/399, 398, 377, 345, 344, 93

[56] References Cited

U.S. PATENT DOCUMENTS

| | | | |
|---|---|---|---|
| 4,292,479 | 9/1981 | Chataignan et al. | 379/405 |
| 4,301,336 | 11/1981 | Müting | 379/405 |
| 4,358,643 | 11/1982 | Levy | 379/402 |
| 5,280,526 | 1/1994 | Laturell | 379/405 |

FOREIGN PATENT DOCUMENTS

| | | | |
|---|---|---|---|
| 0086182 | 8/1983 | European Pat. Off. | 379/345 |
| 57-25731 | 2/1982 | Japan . | |
| 61-234627 | 10/1986 | Japan | 379/345 |
| 63-84323 | 4/1988 | Japan . | |
| 1-261960 | 10/1989 | Japan | 379/402 |
| 2-082794 | 3/1990 | Japan | 379/345 |
| 3-096055 | 4/1991 | Japan | 379/345 |

OTHER PUBLICATIONS

"Novel Active Hybrid Circuit and its Applications", 5. B. Park, Electronics Letters vol. 11, No. 16, pp. 362–363, 7 Aug. 1975.

*Primary Examiner*—Jeffery A. Hofsass
*Assistant Examiner*—Scott L. Weaver

[57] ABSTRACT

A hybrid circuit applies a data sending signal and an inverted data sending signal to the ends of a primary coil, so that the primary coil receives voltages based on the sum of the voltages of the two signals. As a result, the gains of internal amplifiers can be small, thereby maintaining low level voltages in the hybrid circuit. In addition, because the hybrid circuit is balanced, grounding is unnecessary and noise is kept at a low level.

15 Claims, 5 Drawing Sheets

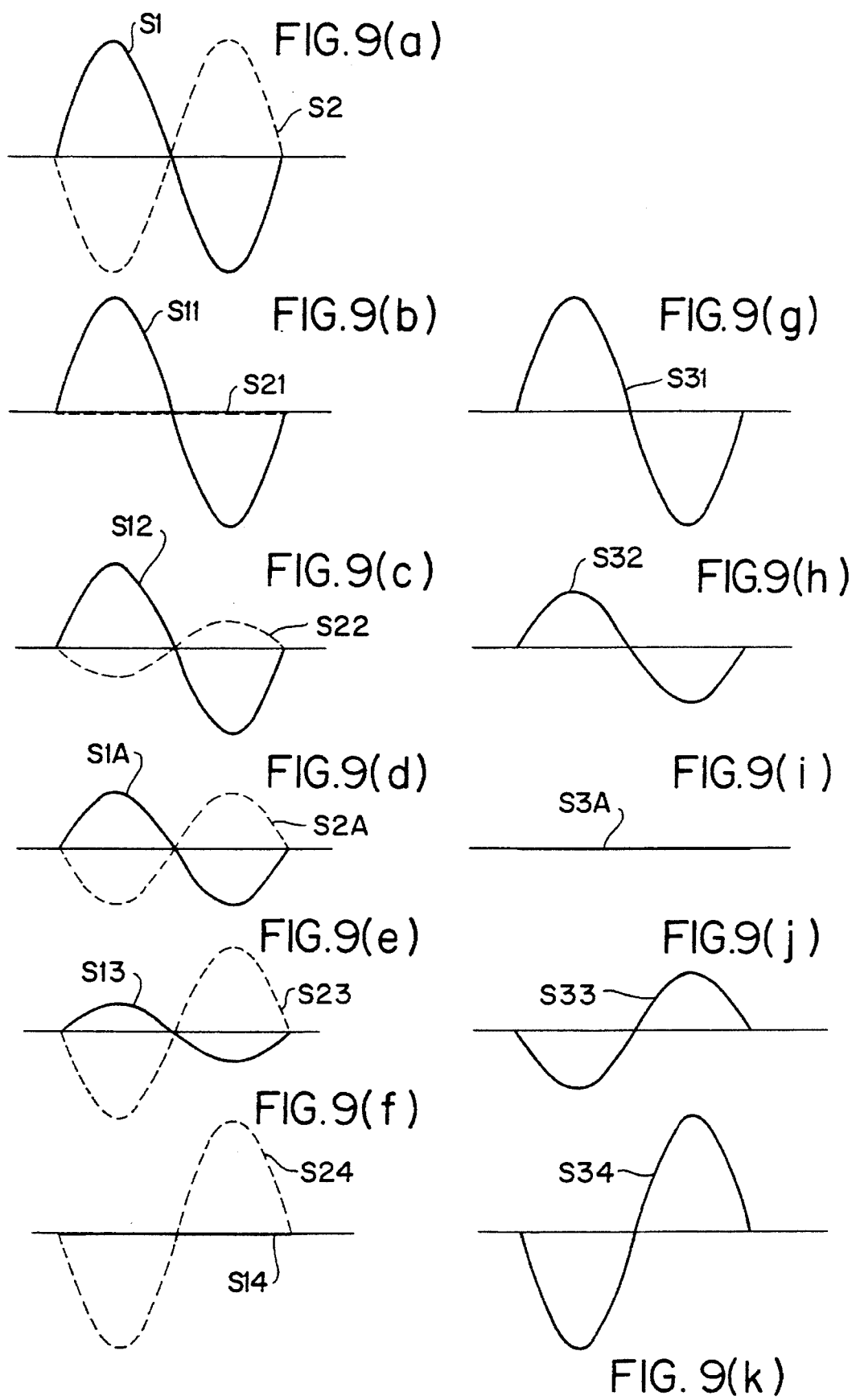

LOW VOLTAGE BALANCED HYBRID CIRCUIT WITH OPERATIONAL AMPLIFIERS

BACKGROUND OF THE INVENTION

1. Field of the Invention

The present invention relates to a hybrid circuit for connecting a four-line device for inputting and outputting signals such as a modem, and a two-line communication line such as telephone lines.

2. Description of the Related Art

FIG. 4 is a block diagram of a hybrid circuit 103 connected between a modem (modulation and demodulation device) 101 and a telephone line 102.

As is shown in FIG. 4, the hybrid circuit 103 converts a signal from the modem 101 into a signal for the telephone line 102 having a pair of lines, and converts a signal from the telephone line 102 into a signal for the modem 101. Reference numeral 104 denotes a pair of lines through which a signal from the modem 101 is sent to the hybrid circuit 103, and reference numeral 105 denotes a pair of lines through which a signal from the hybrid circuit 103 is sent to the modem 101. Hereinafter, a pair of lines such as the pair of lines 104 will be referred to as the "signal sending line", and a line such as the pair of lines 105 will be referred to as the "signal receiving line". A signal sent through the signal sending line will be referred to as the "data sending signal", and a signal sent through the signal receiving line will be referred to as the "data receiving signal". Although the pairs of lines 102, 104 and 105 are each shown as a single line in FIG. 4, they each include two lines in practice. The hybrid circuit 103 has such a structure as to output a data sending signal sent through the signal sending line 104 to the telephone line 102 without leaking the data sending signal to the signal receiving line 105, and also as to output a data receiving signal sent through the telephone line 102 to the signal receiving line 105 without leaking the data receiving signal to the signal sending line 104.

Referring to FIGS. 5 and 6, an example of a conventional hybrid circuit will be described. FIG. 5 is a circuit diagram of a conventional hybrid circuit 106 disclosed in Japanese Laid-Open Patent Publication No. 63-84323, and FIG. 6 is a schematic circuit diagram of the hybrid circuit 106.

As is shown in FIG. 5, in the hybrid circuit 106, a data sending signal is sent to an inverting input of an operational amplifier 21 through a resistor R22. An output of the operational amplifier 21 is connected to the inverting input of the operational amplifier 21 through a resistor R23. A non-inverting input of the operational amplifier 21 is grounded. Thus, a feedback loop of the operational amplifier 21 includes the resistor R23. Due to such a structure, the operational amplifier 21 acts as an inverting amplifier. An output from the operational amplifier 21 is sent to an end of a primary coil 22a of a line transformer 22 through a resistor 21. The other end of the primary coil 22a is grounded. Two ends of a secondary coil 22b of the line transformer 22 are both connected to a pair of telephone lines 28.

An end of the resistor R21 which is on the side of the line transformer 22 is connected to a noninverting input of an operational amplifier 23, and the other end of the resistor R21 is connected to an inverting input of the operational amplifier 23 through a resistor R24. A feedback loop of the operational amplifier 23 includes a resistor R25. Due to such a structure, the operational amplifier 23 acts as a differential amplifier.

In FIG. 5, an impedance of the primary coil 22a of the line transformer 22 can be assumed to include only a resistor component (hereinafter, indicated by symbol "Z1L"). Accordingly, resistances of the resistors R21, R24 and R25 and the resistor component Z1L of the impedance of the primary coil 22a are set to have the relationship expressed by R21:Z1L=R24:R25 for simplicity. Hereinafter, the reference numerals denoting the resistors will also be used to indicate the resistances of the respective resistors.

The hybrid circuit 106 having the abovedescribed structure operates in the following manner.

First, a case where a data sending signal is inputted from a signal sending line (not shown) to the hybrid circuit 106 will be described.

The data sending signal sent to the inverting input of the operational amplifier 21 is amplified by R23/R22 (namely, by a gain α) by the operation amplifier 21 and is outputted from the operational amplifier 21. The amplified signal is sent to the primary coil 22a through the resistor R21. As a result, a voltage obtained by multiplying the voltage of the signal outputted from the operational amplifier 21 by Z1L/(R21+Z1L) is applied to the primary coil 22a. Practically, the resistances of the resistor R21 and the resistor component Z1L of the primary coil 22a are set to have the relationship expressed by R21=Z1L in order to obtain impedance matching of the line transformer 22. Accordingly, the primary coil 22a is supplied with a voltage which is ½ of the output voltage from the operational amplifier 21. The voltage applied to the primary coil 22a is then sent to the telephone lines 28 through the secondary coil 22b.

During the above-described operation, the output voltage from the operational amplifier 21 is also inputted to the operational amplifier 23 in the following manner.

The output voltage from the operational amplifier 21 is inputted to the inverting input of the operational amplifier 23 in the state of being divided proportionally to the resistances of R24 and R25. The output voltage is inputted to the non-inverting input of the operational amplifier 23 in the state of being divided proportionally to the resistances of R21 and Z1L. Since R21:Z1L=R24:R25, the voltage inputted to the inverting input and the voltage inputted to the non-inverting input of the operational amplifier 23 are equal to each other, and thus these two inputs counterbalance each other. As a result, the data sending signal from the operational amplifier 21 is not sent to a signal receiving line (not shown).

In the case where a data receiving signal is sent from the telephone lines 28 to the hybrid circuit 106, the hybrid circuit 106 operates in the following way.

The voltage induced to the primary coil 22a is sent to the non-inverting input of the operational amplifier 23, and also to the inverting input of the operational amplifier 23 through the resistors R21 and R24. The difference between the potential at an end of the resistor R21 on the side of the line transformer 22 and a potential at an end of the resistor R24 on the side of the operational amplifier 23 is amplified by the operational amplifier 23 by (R21+R24)/R25, and the resultant output is sent to the signal receiving line.

In the hybrid circuit 106, with regard to the data sending signal sent to the hybrid circuit 106 through the signal sending line, the resistances of the resistors R21, R24 and R25 are set in advance so that the voltages inputted to the inverting input and the non-inverting input of the operational amplifier 23 will be equal to each other. Accordingly, only the voltage induced to the primary coil 22a of the line transformer 22 is outputted to the signal receiving line as a data receiving signal.

FIG. 6 is a schematic circuit diagram of the hybrid circuit 106. "α", "½" and "1" in amplifiers 24 through 26 are the gains of the respective amplifiers. Operation of the hybrid circuit 106 will be briefly described with reference to FIG. 6.

A data sending signal sent through the signal sending line (not shown) to the hybrid circuit 106 is amplified by the amplifier 24 by a gain of a and then is sent to the primary coil 22a of the line transformer through the resistor R21. As a result, the voltage obtained by amplifying the voltage of the data sending signal by a and further amplifying the resultant voltage by Z1L/(R21+Z1L) (namely, by ½) is applied to two ends of the primary coil 22a.

The voltage of the data sending signal is also sent to a subtracter 27 after being amplified by α by the amplifier 24 and then attenuated to be ½ by the amplifier 25. Namely, the voltage applied to the subtracter 27 is α/2 times the voltage of the data sending signal. The subtracter 27 also receives the voltage obtained by dividing the output from the amplifier 24 into ½ by the resistor R21 and then amplifying the resultant voltage by 1 by the amplifier 26. The latter voltage is also α/2 times the voltage of the data sending signal. The subtracter 27 obtains the difference between the outputs from the amplifiers 25 and 26. Since the two voltages are equal to each other, no signal is sent from the subtracter 27.

With regard to the data receiving signal from the telephone lines 28 (FIG. 5), the data receiving signal induced to the primary coil 22a is amplified by "1" by the amplifier 26 and outputted to the signal receiving line (not shown).

In conventional hybrid circuits such as the hybrid circuit 106, the voltage of the data sending signal is divided proportionally to the resistances R21 and Z1L; namely, the voltage is attenuated to be ½. In order to compensate for such division, the gain of the amplifier 24 or the operational amplifier 21 should be raised to approximately twice as high as α. Due to such a requirement, it is difficult to incorporate such a hybrid circuit into an LSI since signals in such a hybrid circuit cannot have low voltages, as is required for an LSI.

For example, Japanese Laid-Open Patent Publication No. 57-25731 proposes a hybrid circuit in which the voltages of the signals can be maintained low. Referring to FIG. 7, such a hybrid circuit will be described. FIG. 7 is a circuit diagram of a hybrid circuit 107.

As is illustrated in FIG. 7, a data sending signal is inputted to the hybrid circuit 107 through an operational amplifier 31. The operational amplifier 31 is a buffer amplifier provided with a negative feedback loop for inputting an output therefrom directly to an inverting input thereof. The operational amplifier has a gain of 1. The output from the operational amplifier 31 is sent to an end of a primary coil 32a of a line transformer 32 through a resistor R31 and also is sent to an inverting input of an operation amplifier 33 through a resistor R32. As is in the hybrid circuit 106, assuming an impedance Z1L of the primary coil 32a of the line transformer 32 includes only a resistor component, the resistances of the resistor R31 and the resistor component Z1L of the impedance of the primary coil 32a are set to have the relationship expressed by R31:Z1L=1:1.

The operational amplifier 33 is provided with a negative feedback loop including a resistor R33, and the non-inverting input of the operational amplifier 33 is grounded. The resistors R32 and R33 have the relationship expressed by R32:R33=1:1. Due to such a structure, the operational amplifier 33 acts as an inverting amplifier having a gain of "1". The output from the amplifier 33 is sent to the other end of the coil 32a of the line transformer 32. Two ends of a secondary coil 32b of the line transformer 32 are connected to a pair of telephone lines 29.

A junction point b of the resistor R31 and the primary coil 32a is connected to a non-inverting input of an operational amplifier 34. The operational amplifier 34 is a buffer amplifier provided with a negative feedback loop for inputting an output therefrom directly to an inverting input thereof. The operational amplifier 34 outputs a data receiving signal to a signal receiving line (not shown).

Symbol a denotes an output point of the operational amplifier 31, and symbol c denotes an output point of the operational amplifier 33. Although the resistor R31 is shown as having a variable impedance in the publication of Japanese Laid-Open Patent Publication No. 57-25731, the resistor R31 is shown as a resistor component here for simplicity. The operational amplifier 31 may be an inverting amplifier such as the operational amplifier 21 in FIG. 5 in order to adjust gain.

In the hybrid circuit 107, in the case, for example, that an instantaneous voltage at the output point a becomes +2 V by input of a data sending signal, such a voltage is applied to a series circuit including the resistor R31 and the primary coil 32a. The voltage of +2 V is also inverted by the operational amplifier 33, and so the voltage at the output point c is −2 V. The voltage of −2 V is also applied to the series circuit including the resistor R31 and the primary coil 32a. Due to the relationship expressed by R31:Z1L=1:1, the junction point b receives a voltage of +1 V, which is ½ of the output voltage from the operational amplifier 31 and also receives a voltage of −1 V, which is ½ of the output voltage from the operational amplifier 33. As a result, the voltage at the junction point b is 0 V. Accordingly, the voltage applied to the primary coil 32 is (voltage at the junction point b)−(voltage at the output point c)=+2 V. In other words, the output voltage from the operational amplifier 31 is applied to the primary coil 32a as it is. Since the voltage at the point b is constantly 0 V, the data sending signal does not leak to the output from the operational amplifier 34.

In the hybrid circuit 107 in FIG. 7, a data sending signal is not attenuated by division of the voltage thereof. Accordingly, it is not necessary to amplify a data sending signal by a high gain as is necessary in the hybrid circuit 106 illustrated in FIGS. 5 and 6. Consequently, the voltages of the signals in the hybrid circuit 107 can be maintained low, and thus the hybrid circuit 107 can suitably be incorporated into an LSI.

For hybrid circuits incorporated into an LSI, low noise is demanded as well as low voltages. Such a demand is especially great when a hybrid circuit is incorporated into an LSI together with an A/D converter, a D/A converter and the like, or other digital circuits. Noise, which is mixed into grounding wiring by the existence of the digital circuits, should be removed. By lowering the gain of amplifiers included in a hybrid circuit, the noise in the hybrid circuit can be reduced.

In the hybrid circuit 107 shown in FIG. 7, noise cannot sufficiently be removed due to the hybrid circuit 107 being connected to the grounding wiring although the gain is low.

SUMMARY OF THE INVENTION

The hybrid circuit according to the present invention includes a first amplifier for amplifying a first signal; a second amplifier amplifying a second signal obtained by inverting the first signal; a first voltage drop circuit for dropping a first voltage of the first signal amplified by the first amplifier to a second voltage; a second voltage drop circuit for dropping a third voltage of the second signal amplified by the second amplifier to a fourth voltage; a transformer including a primary coil having an end for receiving the first signal having the second voltage and another end for receiving the second signal having the fourth voltage, and a secondary coil for receiving a communication signal; a third amplifier for amplifying the first signal having the first voltage; a fourth amplifier for amplifying the first signal having the second voltage to have an identical level with the level of the output from the third amplifier; a fifth amplifier for amplifying the second signal having the third voltage; a sixth amplifier for amplifying the second signal having the fourth voltage to have an identical level with the level of the output from the fifth amplifier; a first comparator for outputting a difference between the voltage of the output from the third amplifier and the voltage of the output from the fourth amplifier; and a second comparator for outputting a difference between the voltage of the signal output from the fifth amplifier and the voltage of the output from the sixth amplifier.

In one embodiment of the invention, the first voltage drop circuit includes a first resistor, and the second voltage drop circuit includes a second resistor.

In another embodiment of the invention, the first, the second, the third, the fourth, the fifth, and the sixth amplifier each have a gain of 1 at the maximum.

In still another embodiment of the invention, a third resistor is used to act at least as the third amplifier and the fifth amplifier; and a fourth resistor is used to act at least as the fourth amplifier and the sixth amplifier.

In still another embodiment of the invention, a first operational amplifier is used to act at least as the first amplifier and the second amplifier means; and a second operational amplifier is used to act at least as first comparison means and second comparison means.

In still another embodiment of the invention, further including a capacitor connected in series to the first operational amplifier, a capacitor connected in series to the second operational amplifier, and a capacitor connected in parallel to the second operational amplifier.

The hybrid circuit according to another aspect of the present invention includes first voltage drop circuit for receiving a first signal having a first voltage, and for dropping the first voltage of the first signal to a second voltage; second voltage drop circuit for receiving a second signal having a third voltage, and for dropping from the third voltage of the second signal to a fourth voltage; transformer circuit including a primary coil having an end for receiving the first signal having the second voltage and another end for receiving the second signal having the fourth voltage, and a secondary coil for receiving a communication signal; first amplification circuit for amplifying the first signal having the second voltage to have an identical voltage with the first voltage of the first signal and for outputting the first signal having a amplified second voltage; second amplification circuit for amplifying the second signal having the fourth voltage to have an identical voltage with the third voltage of the second signal and for outputting the second signal having a amplified fourth voltage; first comparison circuit for outputting a difference between the first voltage of the first signal and the amplified second voltage; and second comparison circuit for outputting a difference between the third voltage of the second signal and the amplified fourth voltage.

The hybrid circuit according to another aspect of the present invention includes first voltage drop circuit for receiving a first signal having a first voltage, and for dropping the first voltage of the first signal to a second voltage; second voltage drop circuit for receiving a second signal having third voltage, and for dropping the third voltage of the second signal to a fourth voltage; transformer circuit including a primary coil having an end for receiving the first signal having the second voltage and another end for receiving the second signal having the fourth voltage, and a secondary coil for receiving a communication signal; third voltage drop circuit for dropping the first voltage of the first signal to a fifth voltage to have an identical voltage with the second voltage of the first signal; fourth voltage drop circuit for dropping the third voltage of the second signal to a sixth voltage to have an identical voltage with the fourth voltage of the second signal; first comparison circuit for outputting a difference between the second voltage of the first signal and the fifth voltage; and second comparison circuit for outputting a difference between the fourth voltage of the second signal and the sixth voltage.

Thus, the invention described herein makes possible the advantages of providing a hybrid circuit maintaining the gain of each amplifier low and also maintaining the noise level low.

These and other advantages of the present invention will become apparent to those skilled in the art upon reading and understanding the following detailed description with reference to the accompanying figures.

BRIEF DESCRIPTION OF THE DRAWINGS

FIG. 9(a)–9(k) is a schematic illustration of several signal waveforms occurring at various locations in a hybrid circuit according to the present invention.

DESCRIPTION OF THE PREFERRED EMBODIMENTS

Hereinafter, the present invention will be described by way of illustrative examples with reference to the accompanying drawings.

EXAMPLE 1

Figure 1:
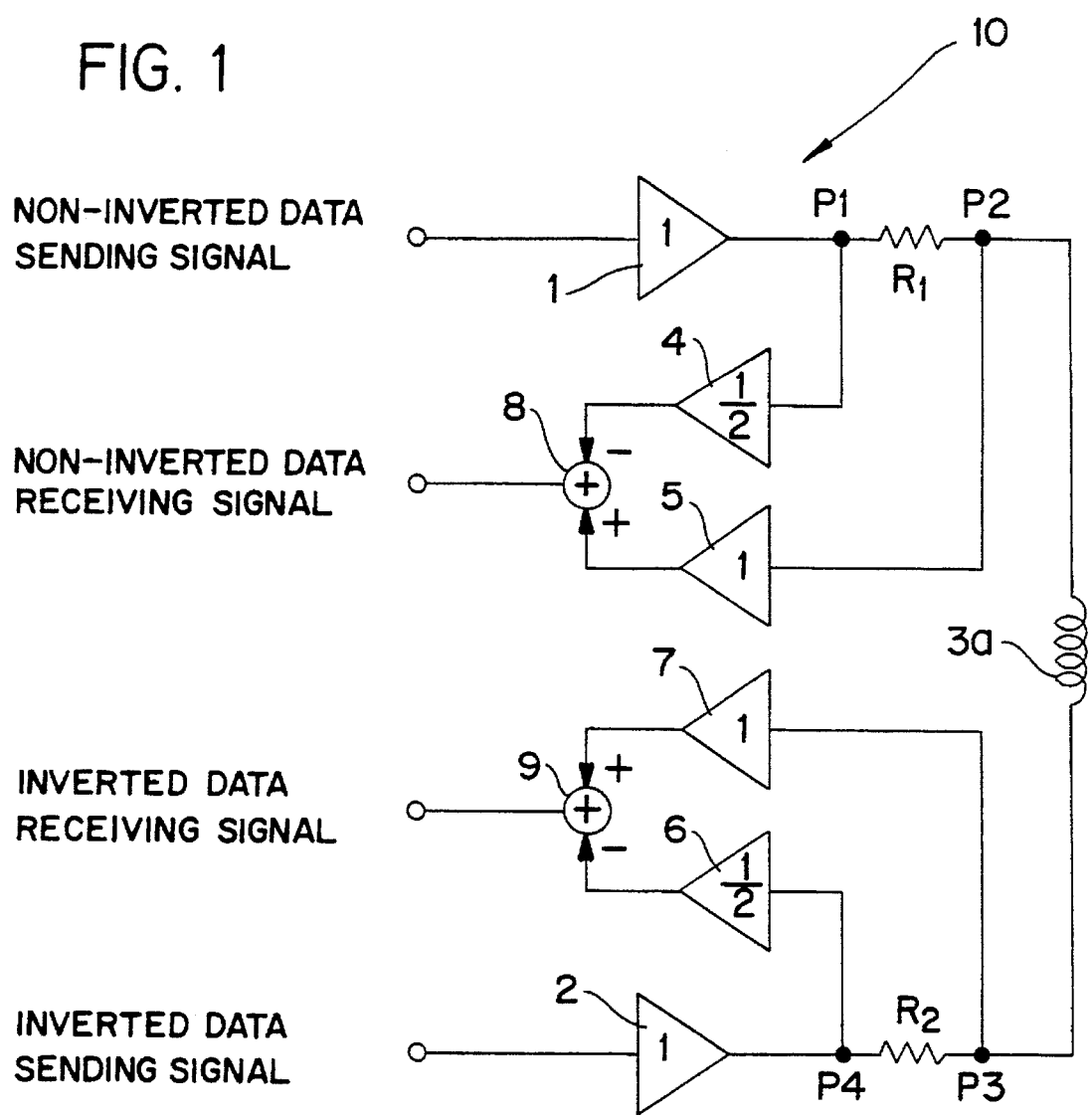
FIG. 1 is a schematic circuit diagram of a hybrid circuit in a first example according to the present invention.
Figure 2:
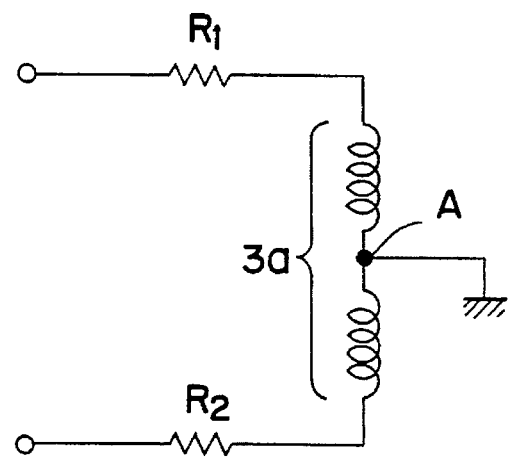
FIG. 2 is a circuit diagram showing a hypothetical grounding point in a part of the hybrid circuit illustrated in FIG. 1.
Figure 3:
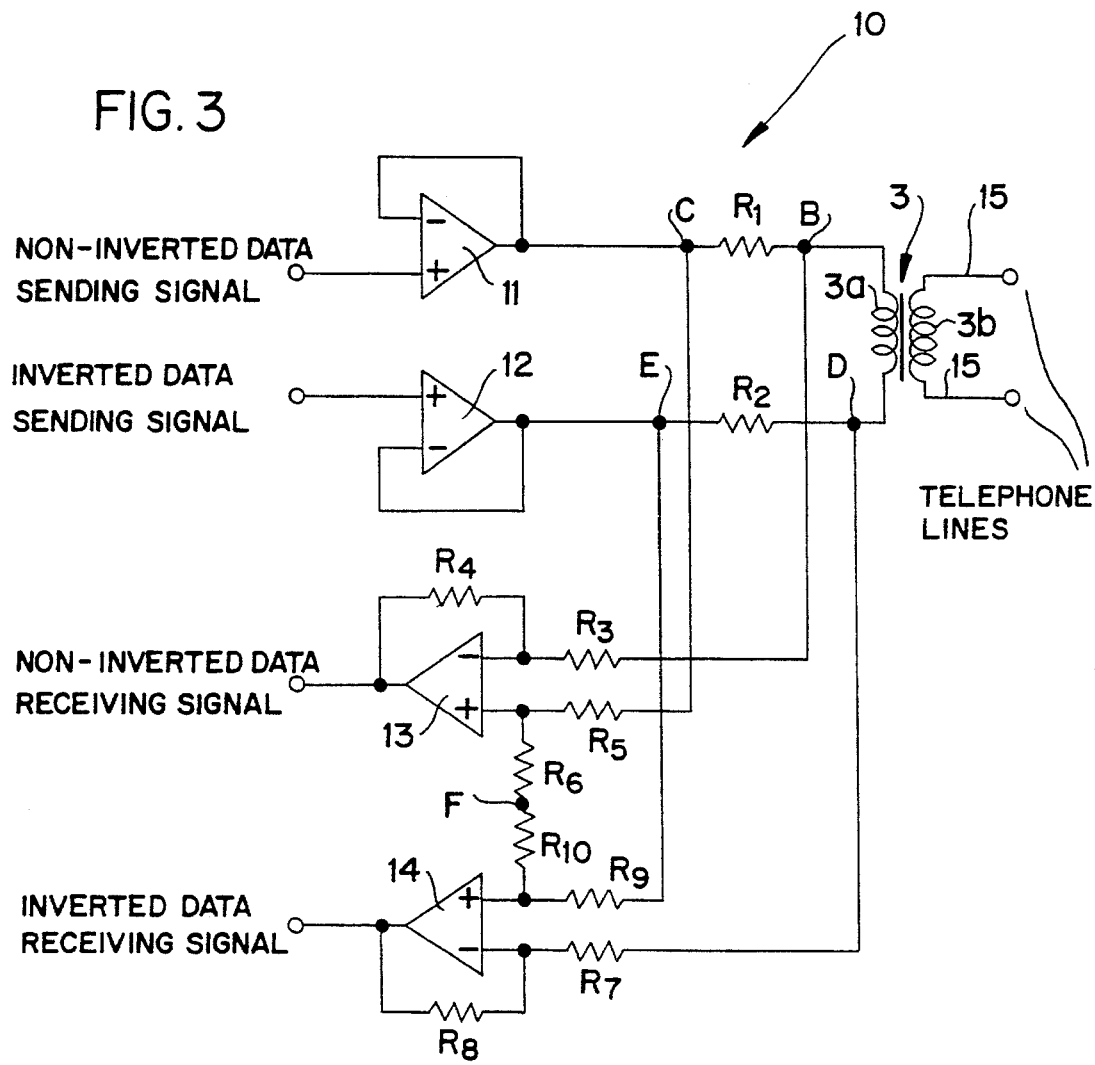
FIG. 3 is a circuit diagram illustrating a practical example of a circuit configuration of the hybrid circuit illustrated in FIG. 1.
Figure 4:
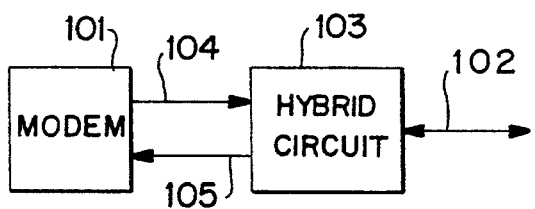
FIG. 4 is a block diagram showing a hybrid circuit connected between a modem and a telephone line.
Figure 5:
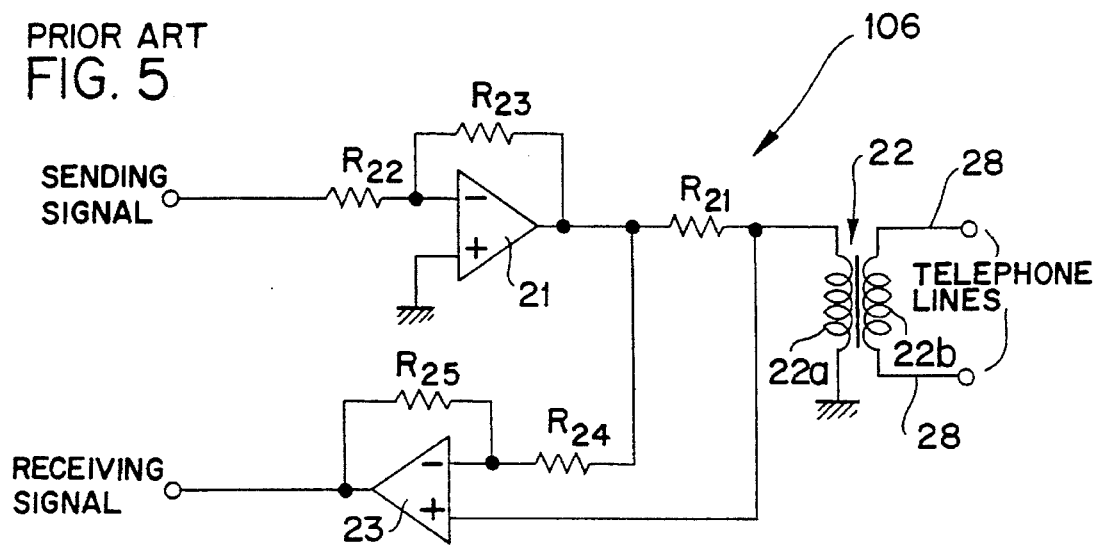
FIG. 5 is a circuit diagram of a conventional hybrid circuit.
Figure 6:
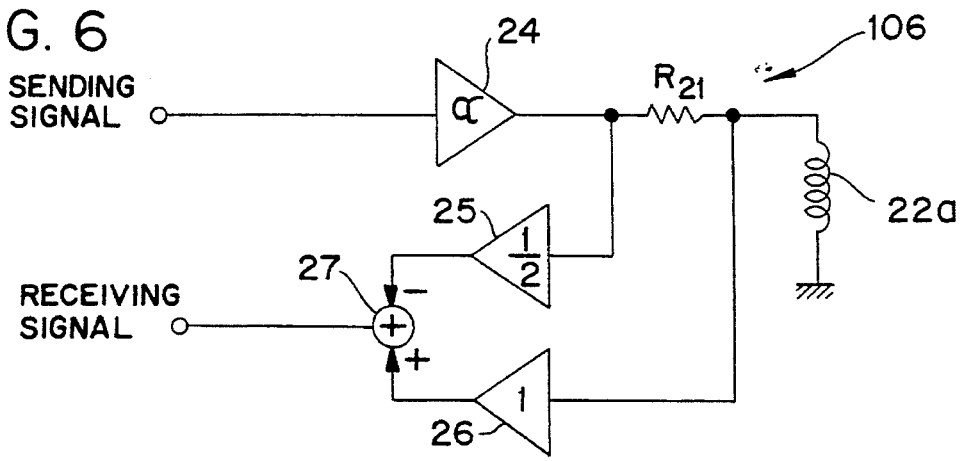
FIG. 6 is a schematic circuit diagram of the conventional hybrid circuit shown in FIG. 5.
Figure 7:
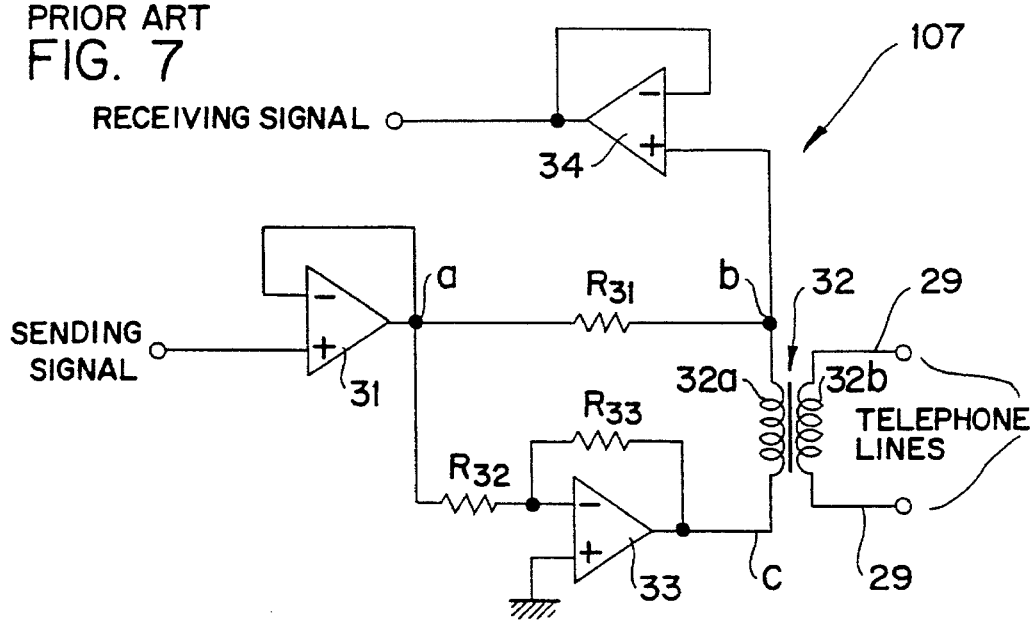
FIG. 7 is a circuit diagram of another conventional hybrid circuit.

Referring to FIGS. 1 through 3, a first example according to the present invention will be described. FIG. 1 is a schematic circuit diagram of a hybrid circuit 10 in the first example according to the present invention. Numerical figures shown in the amplifiers in FIG. 1 indicate the gains of the respective amplifiers.

The hybrid circuit 10 includes an amplifier 1 for receiving a non-inverted data sending signal and an amplifier 2 for receiving an inverted data sending signal, which is obtained by inverting the non-inverted signal. The amplifier 1 is a buffer amplifier having a gain of 1, and an output from the amplifier 1 is sent to an end of a primary coil $3a$ of a line transformer (secondary coil is not shown) through a resistor R1. The amplifier 2 is a buffer amplifier having a gain of 1, and an output from the amplifier 2 is sent to the other end of the primary coil $3a$ of the line transformer through a resistor R2 having the same resistance with that of the resistor R1. Here, assuming that an impedance Z1L of the primary coil $3a$ includes only a resistor component for simplicity, the resistances of the resistors R1 and R2 and the resistor component Z1L of the primary coil $3a$ are set to have the relationship expressed by R1:R2:Z1L=1:1:2 in order to obtain impedance matching of the line transformer.

In a hybrid circuit for receiving a signal from telephone lines (not shown), the resistors R1 and R2 each have a resistance of 100 to 3,000 ohms, and preferably a resistance of 150 to 1,000 ohms.

An end of the resistor R1 on the side of the primary coil $3a$ is connected to an amplifier 5 having a gain of 1. An output of the amplifier 5 is connected to a positive input of a subtracter 8. The other end of the resistor R1 is connected to an amplifier 4 having a gain of ½, and an output of the amplifier 4 is connected to a negative input of the subtracter 8. The subtracter 8 subtracts the output to the negative input from the output to the positive input, and as a result, outputs a non-inverted data receiving signal.

An end of the resistor R2 on the side of the primary coil $3a$ is connected to an amplifier 7 having a gain of 1, and an output from the amplifier 7 is connected to a positive input of a subtracter 9. The other end of the resistor R2 is connected to an amplifier 6 having a gain of ½, and an output from the amplifier 6 is connected to a negative input of the subtracter 9. The subtracter 9 subtracts the output to the negative input from the output to the positive input, and as a result, outputs an inverted data receiving signal.

The amplifiers 1, 2 and 4 to 7 are ideal amplifiers in which the output impedance is 0 and the input impedance is infinite. Operational amplifiers can be considered to be extremely proximate to such ideal amplifiers.

Operation of the hybrid circuit 10 having the above-described structure will be described with reference to FIGS. 1, 2 and 9.

As is mentioned above, the resistances of the resistors R1 and R2 and the resistor component Z1L of the impedance of the primary coil $3a$ have the relationship expressed by R1:R2:Z1L=1:1:2.

FIG. 2 is a conceptual view of a part of the hybrid circuit 10 to explain the operation of the hybrid circuit 10. FIG. 2 indicates a hypothetical grounding point A at the middle point of the primary coil $3a$. In FIG. 1, symbol P1 denotes a junction point of the amplifier 1 and the resistor R1, symbol P2 denotes a junction point of the resistor R1 and the primary coil $3a$, symbol P3 denotes a junction point of the primary coil $3a$ and the resistor R2, and symbol P4 denotes a junction point of the resistor R2 and the amplifier 2.

FIG. 9 is a schematic illustration of several signal waveforms occurring at various locations in the hybrid circuit 10. For example, a non-inverted data sending signal S1 illustrated in part (a) is inputted to the hybrid circuit 10 through the amplifier 1. Signal S1 is amplified by the amplifier 1 to be signal S11. Signal S11 has a waveform illustrated in part (b) at junction point P1.

Signal S11 is sent through the resistor R1 to be signal S12. Signal S12 has a waveform illustrated in part (c) at junction point P2. The level of signal S12 is ¾ of the level of the S11 due to the resistor R1.

Signal S12 is sent through the primary coil $3a$ to be signal S1A. Signal S1A has a waveform illustrated in part (d) at hypothetical grounding point A. The level of signal S1A is ½ of the level of signal S11.

Signal S1A is sent further through the primary coil $3a$ to be signal S13. Signal S13 has a waveform illustrated in part (e) at junction point P3. The level of signal S13 is ¼ of the level of signal S11.

Signal S13 is sent through the resistor R2 to be signal S14. Signal S14 has a waveform illustrated in part (f) at junction point P4. The level of signal S14 is 0.

In the case where an inverted data sending signal S2 illustrated in part (a) is inputted to the hybrid circuit 10 through the amplifier 2, the level of the signal changes in the following manner.

Signal S2 is amplified by the amplifier 2 to be signal S24. Signal S24 has a waveform illustrated in part (f) at junction point P4.

Signal S24 is sent through the resistor R2 to be signal S23. Signal S23 has a waveform illustrated in part (e) at Junction point P3. The level of signal S23 is ¾ of the level of the S24 due to the resistor R2.

Signal S23 is sent through the primary coil $3a$ to be signal S2A. Signal S2A has a waveform illustrated in part (d) at hypothetical grounding point A. The level of signal S2A is ½ of the level of signal S24.

Signal S2A is sent further through the primary coil $3a$ to be signal S22. Signal S22 has a waveform illustrated in part (c) at junction point P2. The level of signal S22 is ¼ of the level of signal S24.

Signal S22 is sent through the resistor R1 to be signal S21. Signal S21 has a waveform illustrated in part (b) at junction point P1. The level of signal S21 is 0.

Practically, the non-inverted signal S1 and the inverted signal S2 are simultaneously inputted to the non-inverting input and the inverting input, respectively. Accordingly, the signal at junction point P1 is signal S31 having a waveform illustrated in part (g) obtained by synthesizing signals S11 and S21. In the same way, the signal at junction point P2 is signal S32 having a waveform illustrated in part (h) obtained by synthesizing signals S12 and S22. The signal at hypothetical grounding point A is signal S3A having a waveform illustrated in part (i) obtained by synthesizing signals S1A and S2A. The signal at junction point P3 is signal S33 having a waveform illustrated in part (j) obtained by synthesizing signals S13 and S23. The signal at junction point P4 is signal S34 having a waveform illustrated in part (k) obtained by synthesizing signals S14 and S24. The level of signal S32 is ½ of the level of signal S11, and the level of signal S33 is ½ of the level of signal S24.

The primary coil $3a$ is divided into two parts by hypothetical grounding point A. These two parts of the primary coil $3a$ are supplied with signals S32 and S33 which are balanced with each other, respectively. The primary coil $3a$ is also supplied with signals S32 and S33 without being attenuated. Based on signals S32 and S33 supplied to the primary coil $3a$, a voltage is induced to a secondary coil (not shown) and such a voltage is outputted to the telephone lines.

The above-described change in the level of the signal will be described with reference to FIG. 1.

Non-inverted data sending signal S1 is amplified by the amplifier 1 to be signal S31 and is sent to the amplifier 4, where the level of signal S31 is amplified by ½, and the resultant signal is sent to the negative input of the subtracter 8. Signal S31 is also sent through the resistor R1 to be signal S32, and the level of signal S32 is amplified by the amplifier 5 by 1, and the resultant signal is sent to the positive input of the subtracter 8. These two signals inputted to the subtracter 8 counterbalance each other. As a result, non-inverted data sending signal S1 is not outputted from the subtracter 8.

Inverted data sending signal S2 is amplified by the amplifier 2 to be signal S34, and then is sent to the amplifier 6, where the level of signal S34 is amplified by ½. The resultant signal is sent to the negative input of the subtracter 9. Signal S34 is also sent through the resistor R2 to be signal S33, and the level of signal S33 is amplified by the amplifier 7 by 1. The resultant signal is sent to the positive input of the subtracter 9. These two signals inputted to the subtracter 9 counterbalance each other. As a result, inverted data sending signal S2 is not outputted from the subtracter 9.

A data receiving signal which is induced to the primary coil 3a from the secondary coil based on the voltage sent from the telephone lines is outputted as a non-inverted data receiving signal through the amplifier 5 and the subtracter 8, and also as an inverted data receiving signal through the amplifier 7 and the subtracter 9.

In the first example, the hybrid circuit 10 is a symmetrical differential circuit. Accordingly, the inverted data receiving signal and the non-inverted data receiving signal are balanced with each other. Again, due to the structure of a symmetrical differential circuit, the amplifiers 1, 2, and 4 through 7 each have a gain of as low as 1 or less, and thus the voltage of the signal sent through the hybrid circuit 10 can be kept low. Although the hypothetical grounding point A is indicated in FIG. 2 for explanation, no grounding is necessary practically as is shown in FIG. 1. Accordingly, the noise level can be kept low. Moreover, non-inversion data sending and receiving signals and inversion data sending and receiving signals are inputted or outputted in a balanced state. Consequently, noise which is mixed into the hybrid circuit 10 can easily be removed.

Where the resistors R1 and R2 each have a resistance of "a" ohms, and the resistor component Z1L of the impedance of the primary coil 3a has a resistance of "2b" ohms, even if the gain of the amplifiers 5 and 7 are both "k" and the gain of the amplifiers 4 and 6 are both "kb/(a+b)", the same effects can be obtained. Further the amplifiers 1 and 2 can be removed from the hybrid circuit 10.

FIG. 3 is a circuit diagram of the hybrid circuit 10 illustrating a practical example of a circuit configuration of the hybrid circuit 10. In FIG. 3, the hybrid circuit 10 includes operational amplifiers and resistors. Practically, the hybrid circuit 10 includes operational amplifiers 11 and 12 instead of the amplifiers 1 and 2. The operational amplifiers 11 and 12 are each provided with a negative feedback loop for inputting an output therefrom directly to an inverting input thereof. Due to such a structure, the operational amplifiers 11 and 12 each act as a buffer amplifier having a gain of 1, and are used for sending a data sending signal to telephone lines 15. Reference numeral 3b denotes a secondary coil of the line transformer 3. Two ends of the secondary coil 3b are connected to the telephone lines 15.

Two ends of the resistor R1 are connected to an inverting input and a non-inverting input of an operational amplifier 13 through resistors R3 and R5, respectively. Two ends of the resistor R2 are connected to an inverting input and a non-inverting input of an operational amplifier 14 through resistors R7 and R9, respectively. An output from the operational amplifier 13 is negatively fed back to the inverting input thereof through a resistor R4, and an output from the operational amplifier 14 is negatively fed back to the inverting input thereof through a resistor R8. The non-inverting inputs of the operational amplifiers 13 and 14 are connected to each other through resistors R6 and R10 which are connected in series. Due to such a structure, the operational amplifiers 13 and 14 each act as a differential amplifier. The resistances of the resistors R3 through R10 are set to have the relationship expressed by R3:R4=R7:R8=1:1, and R5:R6=R9:R10=3:1.

A non-inverted data sending signal and an inverted data sending signal are sent to the telephone lines 15 through the primary coil 3a and the secondary coil 3b of the line transformer 3 as is described with reference to FIG. 3.

The level of the voltage of a non-inverted data sending signal sent through the hybrid circuit 10 in FIG. 3 is changed in the following manner.

The voltage at point B is ½ of the voltage at point C. The voltage at point B is inputted to the inverting input of the operational amplifier 13 in the state of being divided into ½ by the resistors R3 and R4. The voltage at point C is inputted to the noninverting input of the operational amplifier 13 in the state of being divided into ¼ by the resistors R5 and R6. Accordingly, the non-inverting input and the inverting input of the operational amplifier 13 receive voltages of equal level respectively, and thus no noninverted data sending signal is outputted from the operational amplifier 13.

With regard to an inverted data sending signal, the voltage at point D is ½ of the voltage at point E. The voltage at point D is inputted to the inverting input of the operational amplifier 14 in the state of being divided into ½ by the resistors R7 and R8. The voltage at point E is inputted to the noninverting input of the operational amplifier 14 in the state of being divided into ¼ by the resistors R9 and R10. Accordingly, the non-inverting input and the inverting input of the operational amplifier 14 receive voltages of equal level respectively, and thus no inverted data sending signal is outputted from the operational amplifier 14. Point F between the resistors R6 and R10 can be considered as a hypothetical grounding point.

A data receiving signal which is induced to the primary coil 3a from the telephone lines 15 is outputted as a non-inverted data receiving signal through the operational amplifier 13, and also as an inverted data receiving signal through the operational amplifier 14.

By the practical configuration as is shown in FIG. 3, the hybrid circuit 10 shown in FIG. 1 can be realized.

EXAMPLE 2

Figure 8:
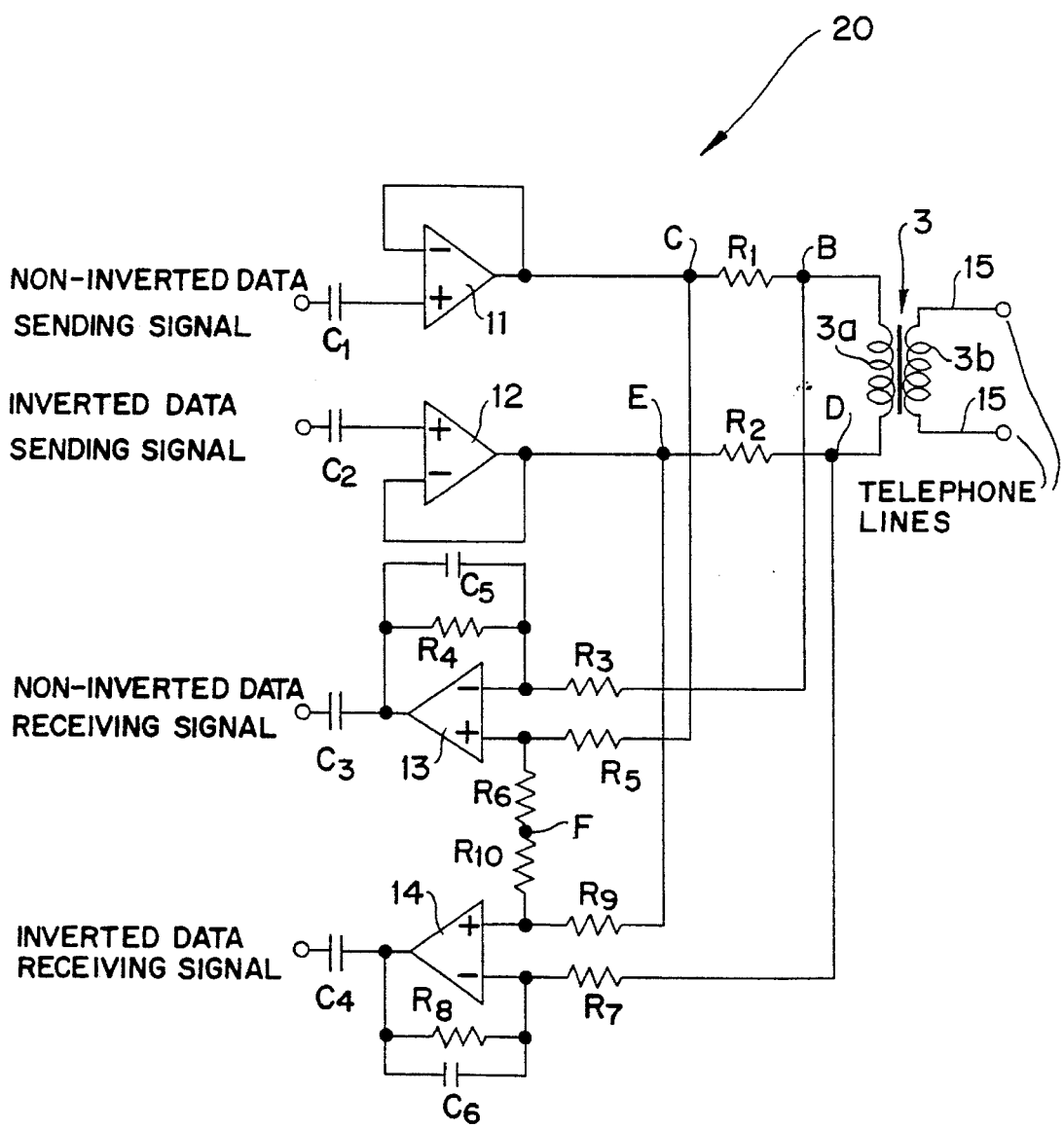
FIG. 8 is a circuit diagram illustrating a practical configuration of a hybrid circuit in a second example according to the present invention.

Referring to FIG. 8, a second example according to the present invention will be described. FIG. 8 is a circuit diagram of a hybrid circuit 20 in the second example according to the present invention. Identical elements with those in the first example bear identical reference numerals therewith.

The hybrid circuit 20 in the second example includes capacitors $C_1$ through $C_6$ are in addition to the structure of the hybrid circuit 10 in the first example. The capacitor $C_1$ is connected in series to the non-inverting input of the operational amplifier 11, and the capacitor $C_2$ is connected in series to the non-inverting input of the operational amplifier 12. The capacitor $C_3$ is connected in series to an output of the operational amplifier 13, and the capacitor $C_4$ is connected in series to an output of the operational amplifier 14. The capacitor $C_5$ is connected in parallel to the resistor R4 which is connected to the operational amplifier 13, and the capacitor $C_6$ is connected in parallel to the resistor R8 which is connected to the operational amplifier 14.

The hybrid circuit 20 operates basically in the same manner as the hybrid circuit 10 as is described with reference to FIGS. 1 through 3 and 9. By appropriately setting the resistances of the resistors R3 through R5 and R7 through R9 and the capacitances of the capacitors $C_3$ through $C_6$ connected to the operational amplifiers 13 and 14, the noise filtering characteristics of the operational amplifiers 13 and 14 can be adjusted as is desired. Accordingly, noise which is mixed into the hybrid circuit 20 and communication lines such as the telephone lines 15 connected to the hybrid circuit 20 can be removed. Preferably, the capacitors $C_1$ through $C_4$ each have a capacitance of 0.01 to 1 μF, and the capacitors $C_5$ and $C_6$ each have a capacitance of 100 to 500 μF. Thus, a hybrid circuit having noise filtering characteristics suitable for the noise level of the communication lines connected thereto can be obtained.

A hybrid circuit according to the present invention may include electric and electronic components other than operational amplifiers and resistors. As long as the circuit configuration illustrated in FIG. 1 is obtained, any type of electric and electronic components can be used.

In a hybrid circuit according to the present invention, a non-inverted data sending signal and an inverted data sending signal obtained by inverting the non-inverted data sending signal are both used as a data sending signal. The non-inverted data sending signal is applied to an end of a primary coil of a line transformer through an amplifier and a resistor. The inverted data sending signal is applied to the other end of the primary coil of the line transformer through another amplifier and another resistor. Accordingly, the primary coil is provided with a voltage which is a sum of the voltages based on the non-inverted data sending signal and the inverted data sending signal. As a result, the gains of the two amplifiers can be small. Thus, the signal voltages in a hybrid circuit according to the present invention can be maintained at a low level.

A data receiving signal induced to the primary coil from a two-line communication line such as telephone lines are outputted to a four-line device such as a modem through a differential amplifier, including an amplifier and a subtracter and also through another differential amplifier including another amplifier and another subtracter.

As is apparent from the above description, a hybrid circuit according to the present invention is a symmetrical differential circuit in which data sending signals and data receiving signals are both inputted or outputted in a balanced state. Due to such a structure, grounding is not necessary, and so the noise level can be maintained at a low level.

Accordingly, a hybrid circuit realizing low gains and low noise level is achieved which is suitable for incorporation into an LSI.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A hybrid circuit, comprising:

two input terminals for respectively receiving a first signal and a second signal, the second signal being an inverted form of the first signal, and for supplying the first signal and the second signal to a telephone line;

two output terminals for outputting a communication signal received from the telephone line;

first amplification means for receiving the first signal from one of the two input terminals and for amplifying the first signal;

second amplification means for receiving the second signal from the other of the two input terminals and for amplifying the second signal;

first voltage drop means for dropping a first voltage of the first signal amplified by the first amplification means to a second voltage;

second voltage drop means for dropping a third voltage of the second signal amplified by the second amplification means to a fourth voltage;

transformer means including a primary coil having an end for receiving the first signal having the second voltage and another end for receiving the second signal having the fourth voltage, and a secondary coil for receiving the communication signal from the telephone line;

third amplification means for amplifying the first signal having the first voltage and for providing an output;

fourth amplification means for amplifying the first signal having the second voltage and for outputting a voltage substantially equal to a voltage of the output from the third amplification means;

fifth amplification means for amplifying the second signal having the third voltage and for providing an output;

sixth amplification means for amplifying the second signal having the fourth voltage and for outputting a voltage substantially equal to a voltage of the output from the fifth amplification means;

first comparison means for outputting a difference between the voltage of the output from the third amplification means and the voltage of the output from the fourth amplification means, the first comparison means connected to one of the output terminals; and second comparison means for outputting a difference between the voltage of the output from the fifth amplification means and the voltage of the output from the sixth amplification means, the second comparison means connected to the other of the output terminals.

2. A hybrid circuit according to claim 1, wherein the first voltage drop means includes a first resistor, and the second voltage drop means includes a second resistor.

3. A hybrid circuit according to claim 1, wherein a ratio of a gain of the first amplification means to a gain of the second amplification means is approximately one-to-one, wherein a ratio of a gain of the third amplification means to a gain of the fourth amplification means is approximately one half-to-one, and wherein a ratio of a gain of the fifth amplification means to a gain of the sixth amplification means is approximately one half-to-one.

4. A hybrid circuit according to claim 1, wherein a set of resistors is used to act at least as the third amplification means and the fifth amplification means; and resistors are used to act at least as the fourth amplification means and the sixth amplification means.

5. A hybrid circuit according to claim 1, wherein the first amplification means and the second amplification means each include a first operational amplifier; and the first comparison means and the second comparison means each include a second operational amplifier.

6. A hybrid circuit according to claim 5, further including a respective capacitor connected in series to an input of each first operational amplifier, a respective capacitor connected in series to an output of each second operational amplifier, and a respective capacitor connected between the output and an input of each second operational amplifier.

7. A hybrid circuit according to claim 1, wherein said hybrid circuit is free of connections to ground.

8. A hybrid circuit according to claim 3, wherein each gain of the first, the second, the third, the fourth, the fifth, and the sixth amplification means is equal to or less than a gain of one.

9. A hybrid circuit according to claim 4, wherein the set of resistors is connected between the first voltage drop means and the second voltage drops means.

10. A hybrid circuit, comprising:

two input terminals for respectively receiving a first signal and a second signal and for supplying the first signal and the second signal to a telephone line;

two output terminals for outputting a communication signal received from the telephone line;

first voltage drop means for receiving the first signal having a first voltage from one of the two input terminals, and for dropping the first voltage of the first signal to a second voltage;

second voltage drop means for receiving the second signal having a third voltage from the other of the two input terminals, and for dropping the third voltage of the second signal to a fourth voltage;

transformer means including a primary coil having an end for receiving the first signal having the second voltage and another end for receiving the second signal having the fourth voltage, and a secondary coil for receiving the communication signal from the telephone line;

first amplification means for receiving the first signal output from the first voltage drop means and for amplifying the first signal having the second voltage to have an amplified second voltage substantially equal to the first voltage of the first signal and for outputting the first signal having the amplified second voltage;

second amplification means for receiving the second signal output from the second voltage drop means and for amplifying the second signal having the fourth voltage to have an amplified fourth voltage substantially equal to the third voltage of the second signal and for outputting the second signal having the amplified fourth voltage;

first comparison means for receiving the first signal having the first voltage and the first signal having the amplified second voltage, and for outputting a difference between the first voltage of the first signal and the amplified second voltage, the first comparison means connected to one of the output terminals; and second comparison means for receiving the second signal having the third voltage and the second signal having the amplified fourth voltage, and for outputting a difference between the third voltage of the second signal and the amplified fourth voltage, the second comparison means connected to the other of the output terminals.

11. A hybrid circuit according to claim 10, wherein said hybrid circuit is free of connections to ground.

12. A hybrid circuit, comprising:

two input terminals for respectively receiving a first signal and a second signal and for supplying the first signal and the second signal to a telephone line;

two output terminals for outputting a communication signal received from the telephone line;

first voltage drop means for receiving a first signal having a first voltage from one of the two input terminals, and for dropping the first voltage of the first signal to a second voltage;

second voltage drop means for receiving a second signal having a third voltage from the other of the two input terminals, and for dropping the third voltage of the second signal to a fourth voltage;

transformer means including a primary coil having an end for receiving the first signal having the second voltage and another end for receiving the second signal having the fourth voltage, and a secondary coil for receiving the communication signal from the telephone line;

third voltage drop means for receiving the first signal having the first voltage and for dropping the first voltage of the first signal to a fifth voltage substantially equal to the second voltage of the first signal;

fourth voltage drop means for receiving the second signal having the third voltage and for dropping the third voltage of the second signal to a sixth voltage substantially equal to the fourth voltage of the second signal;

first comparison means for receiving the first signal having the second voltage and the first signal having the fifth voltage and for outputting a difference between the second voltage of the first signal and the fifth voltage, the first comparison means connected to one of the output terminals; and second comparison means for receiving the second signal having the fourth voltage and the second signal having the sixth voltage and for outputting a difference between the fourth voltage of the second signal and the sixth voltage, the second comparison means connected to the other of the output terminals.

13. A hybrid circuit according to claim 12, wherein said first signal is a data sending signal.

14. A hybrid circuit according to claim 12, wherein said hybrid circuit is free of connections to ground.

15. A hybrid circuit according to claim 13, wherein said second signal is an inverted form of said first signal.

* * * * *